Patented Apr. 27, 1937

2,078,878

UNITED STATES PATENT OFFICE 2,078,878

CHICLE SUBSTITUTE

Dean M. Jackman, Bayside, N. Y., assignor to American Chicle Co., Long Island City, N. Y., a corporation of New Jersey No Drawing. Application November 19, 1935, Serial No. 50,543

5 Claims. (Cl. 99—135)

The object of the present invention is to provide a chicle substitute for any use to which chicle is adapted, and particularly as a chewing gum base having all properties of natural chicle which are essential. The characteristic of the product, subject of the invention, is that it is substantially identical with natural chicle as to all physical properties. Thus, natural chicle softens very rapidly, or, in other words, "starts easily" when chewed, while the known substitutes are tough at the start of the chewing operation and soften only when thoroughly warmed in the mouth. Natural chicle at only slightly lower temperatures and at rest, quickly resumes its normally firm, friable condition, which is a valuable characteristic in commercial manufacture and handling of chewing gum. Furthermore, natural chicle is highly stable and particularly resistant to oxidation.

These and other characteristics not found in known chicle substitutes are found in the product of the present invention.

It is known that chicle is composed of gutta of low viscosity, resins, gums similar to gum arabic, and certain insoluble residue consisting largely of calcium oxalate, the resins being in the major proportion. The low viscosity of the gutta in the presence of the large amount of caproates in the resins explains the fluidity in the kettle of chicle, while the firmness and general quality of the chicle in the chewing thereof are due to the fact that the caproate resins become plastic, but not too soft, at the temperature of the mouth, and the acetate resins which are not entirely dissolved at this temperature, and the calcium oxalate and other residue increase the viscosity just as does any finely divided matter suspended in a viscous solution. While it has been known that chicle contains amyrin caproates and acetate resins, such determination is obtained by qualitative analysis only and without physical separation of the resins themselves, the resins always being accompanied by lupeol compounds and so far as applicant is aware there is no teaching in the art under which amyrin caproate free from lupeol compounds or amyrin acetate free from lupeol compounds can be extracted from chicle.

I have discovered that chicle, disregarding the water-soluble material and calcium oxalate, appears to consist of a comparatively small amount of acetate resins in crystalline form interspersed through a relatively much greater matrix of resins in known crystalline caproate (and perhaps other higher acid) form in which the gutta is dissolved, the gutta thus forming part of the matrix. The segregated crystals of the acetate resins form a lattice or framework which supports the entire mass and makes it rigid when at rest under normal temperatures. The strength of this framework however, is not great, it being easily broken up, and when this is done, the entire mass is immediately softened under the temperature of the mouth. This is in explanation of the fact that chicle "starts easily" when chewed.

When the chicle is melted in the gum kettle, the acetate resins go into solution in the gutta and the other resins. From this solution they crystallize on cooling, thus causing the mass to resume its normal condition in which it is firm and friable.

It is a well known fact that chicle has been unique in the possession of just the proper combination of properties to make it an ideal base for chewing gum and that no other single natural product or known mixture of products, or any chicle substitute heretofore known in the art can be used with equal satisfaction as a substitute for chicle. Chicle substitutes heretofore produced have been based upon a general belief that a substance having sufficient elasticity and the property of masticability under the temperature of the mouth would serve the purpose satisfactorily, but each one has lacked certain important characteristics of natural chicle, either in the ease of conversion by chewing from a hard friable mass to a readily masticable substance, the ability to become firm and friable when melted and allowed to cool, freedom from stickiness, particularly to the teeth, proper firmness and elasticity, proper resistance to chewing or, freedom from objectionable taste or odor.

Based upon my study of the exact kind and relation of the resins to the other constituents of chicle, I have discovered that the properties and behaviour of chicle may be obtained only when the resins have a solubility relationship and proportion, that they dissolve one another mutually when warm, and segregate themselves again on cooling, thereby producing a heterogeneous structure. Specifically it must be realized that the principal factor involved is not the securing of elasticity and a gummy characteristic in the substitute, but the opposite characteristic of crystallizing ability. That these factors were not heretofore understood, is apparent when it is realized that a true crystalloid or colloid is unsuitable. Only combinations of two resins of definite characteristics will produce the desired property, as will now be specifically set forth.

The following is an example of a composition which produces a satisfactory chicle substitute:—

| | Percent |
|---|---|
| Amyrin acetate | 26 to 31 |
| Amyrin caproate | 40 to 50 |
| Resenes | 5 to 8 |
| Depolymerized rubber | 15 to 20 |
| Cocoa butter | 0 to 5 |

The ingredients specified in the above formula may be mixed in the kettle at a temperature up to 105° C., and the mixture stirred in the kettle until a homogeneous mass is secured. I prefer however, to reduce the viscosity of the rubber to a predetermined point before combining it with the major portion of the resins. This can be done by masticating the rubber with about 25% of its own weight of resin or cocoa butter in a kettle at a temperature of 140–150° C. until the desired degree of depolymerization has been obtained. If rubber is used which has been previously depolymerized, I prefer also to melt the resins and to combine them with the rubber in a mixing kettle at a temperature preferably not exceeding 105° C.

I might substitute for all or a part of the resenes, hard balata resin which is a material extracted from balata in the manufacture of various articles such as golf balls, electrical insulation and other goods. To obtain the desired product, when this is done however, it is necessary to use a somewhat larger amount of hard balata resin than the resenes for which it is substituted, in whole or in part, the other materials being correspondingly reduced. As an example, the following formula may be employed:—

| | Percent |
|---|---|
| Amyrin acetate | 26–28 |
| Amyrin caproate | 37–41 |
| Hard balata resin | 11–13 |
| Resenes | 3–4 |
| Depolymerized rubber | 16–18 |
| Cocoa butter | 0–2 |

If the rubber and resin have been properly combined and the chewing consistency has been properly adjusted I add water not to exceed 10% and incorporate it thoroughly while the mass is still in the kettle. I may add certain ingredients intended to retard the oxidation of the base, but I do not regard this as a part of the invention.

After all of the ingredients have been incorporated, and the mixture completed, it is poured out into pans and allowed to cool. It may then be employed in the manufacture of chewing gum in the usual manner.

The amyrin acetate and caproate may be commercially obtained from gum elemi by separation of the two amyrins from the resenes and essential oils, thus producing a white crystalline mass having a melting point of approximately 170° C. Part of this mass is treated to produce the acetate, as by treatment with acetic anhydride, and part of the mass is treated to form the caproate in a manner well known in the preparation of esters from alcohols in general organic chemistry.

The amyrin acetate constitutes the so-called hard crystalline substance, and the amyrin caproate constitutes the so-called soft crystalline substance. The resenes and balata resin, or one of them, constitutes the non-crystalline resin component, and the depolymerized rubber gives elasticity to the mass. I prefer that both resenes and balata resin, or a non-crystalline resin having generally the same physical properties be used together since I do not regard the resenes and balata resin as being exact substitutes. Thus, while in a chewing gum base, either the balata resin or the resenes restrict crystallizing action of the crystalline resins to the proper degree, the resenes are somewhat better solvents for the crystalline resins than is the balata resin.

The following is an example of a composition which eliminates the resenes:—

| | Percent |
|---|---|
| Amyrin acetate | 30 |
| Amyrin caproate | 41 |
| Balata resin | 11½ |
| Crepe rubber | 17½ |

In each of the compositions, the characteristic property is such that a framework structure is obtained by the crystalline resins which supports the entire mass and other ingredients, and this framework has a relative mechanical strength resulting in the proper degree of friability, and the proper ease of becoming plastic with the required degree of elasticity under the action of mouth heat and mastication. The soft crystalline resin, or equally correct as to defining soft crystallizable resin, amyrin caproate being an example, should be a non-toxic, tasteless, substantially odorless resinous material capable of existing for an indefinite period in either a crystalline or a vitreous, amorphous condition. In the crystalline condition it shall have a melting point not lower than 110° C. nor higher than 120° C. When melted and allowed to cool naturally it shall not crystallize but shall solidify slowly, with no abrupt change of state, to a vitreous resin.

The hard crystalline resin, amyrin acetate being an example, shall be non-toxic, tasteless, substantially odorless crystalline resinous material, having a melting point between 190–200° C. When melted and allowed to cool naturally it should not solidify to a vitreous mass, but should crystallize. The non-crystalline resin, of which resenes or hard balata resin are examples, should be non-toxic, tasteless and substantially odorless, and preferably readily soluble in alcohol and other common organic solvents. It should be incapable of any considerable crystallization and having a softening point preferably not less than 64° C. nor more than 70° C. The resenes from gum elemi are appropriate. With regard to mutual solubility relations, the hard crystalline resin, soft crystalline resin and non-crystalline resin should preferably have such solubility relations toward one another and toward depolymerized rubber that when these substances are heated together, as in the proportions of hard crystalline resin 30%, soft crystalline resin 43%, non-crystalline resin 7%, and depolymerized rubber 20%, a complete homogeneous solution shall result at a temperature approximately 85° C., but on cooling, such crystallization of the crystalline resins shall take place in such manner that after several days or one week's time, the mixture shall be firmly "set up", but yet shall be easy to bite into and pleasant to chew.

Having described my invention, what I claim and desire to secure by Letters Patent, is as follows:—

1. A chicle substitute comprising a crystalline resinous material, non-toxic, tasteless and odorless, and having a melting point between 190–200° C., a soft crystalline resinous material, non-toxic, tasteless, substantially odorless and having a melting point between 110° C. and 120° C., both prepared from the alpha and beta amyrins extracted from gum elemi, a non-crystalline resin adapted as a solvent for the crystalline resins, and a material adapted to add elasticity to the mass.

2. A chicle substitute comprising amyrin acetate 26 to 31%, amyrin caproate 40 to 50%, resenes 5 to 8%, depolymerized rubber 15 to 20%.

3. A chicle substitute comprising amyrin acetate 26 to 28%, amyrin caproate 37 to 41%, hard balata resin 11 to 13%, resenes 3 to 4%, depolymerized rubber 16 to 18%.

4. A chicle substitute comprising amyrin acetate 30%, amyrin caproate 41%, balata resin 11½% and crepe rubber 17½%.

5. A chicle substitute comprising a crystalline resinous material, non-toxic, tasteless and odorless, and having a melting point between 190-200° C., a soft crystalline resinous material, non-toxic, tasteless, substantially odorless and having a melting point between 110° C. and 120° C., a non-crystalline resin adapted as a solvent for the crystalline resins, and a material adapted to add elasticity to the mass, the soft crystalline resinous material being in greater proportion than the hard crystalline resinous material.

DEAN M. JACKMAN.